(12) United States Patent
Sheng et al.

(10) Patent No.: US 7,137,496 B2
(45) Date of Patent: Nov. 21, 2006

(54) PARALLEL FIELD ELECTRODE CONFIGURATIONS FOR ELECTRORHEOLOGICAL FLUID APPLICATIONS

(75) Inventors: Ping Sheng, Kowloon (HK); Weijia Wen, Kowloon (HK)

(73) Assignee: China Patent Investment Limited, Hong Kong (CN)

( * ) Notice: Subject to any disclaimer, the term of this patent is extended or adjusted under 35 U.S.C. 154(b) by 7 days.

(21) Appl. No.: 10/807,331

(22) Filed: Mar. 24, 2004

(65) Prior Publication Data

US 2005/0211525 A1 Sep. 29, 2005

(51) Int. Cl.
*F16D 37/02* (2006.01)
*F16D 27/00* (2006.01)
(52) U.S. Cl. .................. 192/21.5; 188/267.1
(58) Field of Classification Search ............ None
See application file for complete search history.

(56) References Cited

U.S. PATENT DOCUMENTS

| | | | | |
|---|---|---|---|---|
| 3,150,678 A | * | 9/1964 | Nuber | 192/21.5 |
| 3,253,200 A | * | 5/1966 | Klass et al. | 361/234 |
| 4,864,461 A | * | 9/1989 | Kasahara | 361/234 |
| 5,054,593 A | * | 10/1991 | Carlson | 192/21.5 |

* cited by examiner

*Primary Examiner*—Rodney H. Bonck
(74) *Attorney, Agent, or Firm*—Buchanan Ingersoll & Rooney PC

(57) ABSTRACT

The present invention provides novel configurations for the electrodes in a range of applications for ER fluids. The electrodes are configured so that they generate an electrical field a significant portion of which extends parallel to any anticipated applied force of direction of likely distortion that may act to disrupt the agglomeration of ER particles. By so arranging the electric field to be parallel to such a force there is a strong binding force that acts to counter and tendency for the particles to be disrupted.

8 Claims, 4 Drawing Sheets

PARALLEL FIELD ELECTRODE CONFIGURATIONS FOR ELECTRORHEOLOGICAL FLUID APPLICATIONS

FIELD OF THE INVENTION

This invention relates to novel field configurations in electrorheological (ER) fluid applications, and to methods and apparatus for generating such field configurations. In particular the present invention relates to ER devices in which the electrode configuration is designed to provide an applied electric field having a significant component that is parallel to any anticipated applied force or direction of distortion.

BACKGROUND OF THE INVENTION

An electrorheological (ER) fluid generally comprises ER particles suspended in an electrically insulating fluid. ER fluids are very well-known and do not need to be described in detail here. Such fluids have the property that the rheological characteristics of the fluid can be controlled by applying an electric field. In particular upon application of an electric field the viscosity of the fluid increases, and this property can be used in a number of applications so that upon application of an electric field the fluid can, for example, either (a) offer resistance to shear, (b) offer resistance to flow, or (c) offer resistance to bending distortion.

However, it is often the case that in ER applications providing shear resistance, the shear resistance will decrease with increasing shear rate, so that at high shear rates the resistance is minimal, i.e., the ER fluid would lose its effectiveness. This is a well-known generic problem. Similar problems would happen when ER fluids are used to provide flow resistance when the flow rate is high. For ER applications intended to provide resistance to bending distortion, while there can indeed be resistance to bending distortion, the stiffness that results is usually not high enough for many applications.

SUMMARY OF THE INVENTION

According to the present invention there is provided an electrorheological device comprising an electrorheological fluid and electrode configuration arranged such that an electric field is generated having a significant component parallel to the direction of an anticipated external stress field.

By providing an electrode configuration that generates a field with at least a significant component that is parallel to the direction of any form of external force that is liable to disrupt the agglomeration of ER particles, a stronger electrorheological binding force is provided between the particles to resist any tendency for the agglomeration of particles to be broken up.

Preferably the electrode configuration comprises a plurality of positive and negative electrodes formed on an insulating substrate, said electrodes being disposed on the substrate so as to provide a series of equidistantly spaced alternately positive and negative electrodes in the said direction.

The above inventive concept can be applied in a number of different electrorheological applications.

For example, viewed from another broad aspect the present invention provides an electrorheological clutch comprising, a cylindrical drive member, a cylindrical driven member and an electrorheological fluid disposed between said drive member and said driven member, wherein said clutch further comprises an electrode configuration for generating an electric field, said electrode configuration being such as to generate a significant component parallel to the surfaces of the drive and driven members and perpendicular to an axis of rotation of said drive and driven members.

The clutch may comprise a cylindrical rotor provided within a cylindrical housing, the rotor being adapted to rotate about the axis of rotation, and the electrode configuration may comprise a plurality of strip electrodes parallel to the axis of rotation and spaced equidistantly about the axis of rotation such that positive and negative electrodes alternate about the axis. The spacing between the rotor and the cylindrical housing is preferably of the same order of magnitude as the spacing between adjacent positive and negative electrodes.

The cylindrical rotor may, for example, be provided at opposite ends with first and second electrodes, and the strip electrodes extend from the first and second electrodes on the outer surface of the cylindrical rotor toward the other of the first and second electrodes. Preferably strip electrodes parallel to the axis of rotation are additionally provided on the inner surface of the cylindrical housing.

The strip electrodes extending from the first electrode toward the second electrode, and the strip electrodes extending from the second electrode toward the first electrode should ideally be of equal length and be equally spaced from each other.

In another broad aspect the underlying inventive concept can be embodied in a device that restricts the flow of an ER fluid (such a device can, for example, be used as a damper) and therefore viewed from a further broad aspect the present invention also extends to apparatus for restricting the flow of an electrorheological fluid, comprising: a channel defining a flow path for said electrorheological fluid, said channel being formed of an insulating material and being formed with a plurality of electrodes thereon, said electrodes extending transversely to said fluid flow path and alternate electrodes being respectively positively and negatively charged.

The electrodes are preferably equidistantly spaced from each other in the direction of fluid flow, and preferably the channel has a width of the order of the spacing between two adjacent positive and negative electrodes.

The channel may be tubular with the electrodes extending around an inner circumference of the channel. Alternatively the channel may be defined by two parallel insulating plates and the electrodes are formed on one of said plates.

According to a further aspect of the present invention there is provided a tubular member of variable stiffness, comprising a sheet of insulating material rolled about an axis to define said tubular member, said sheet of insulating material being formed with alternating positive and negative strip electrodes arranged on said insulating sheet such that each strip electrode extends transversely to said axis and such that alternating negative and positive electrodes are equidistantly spaced along said axis, and an electrorheological fluid provided between said electrodes.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
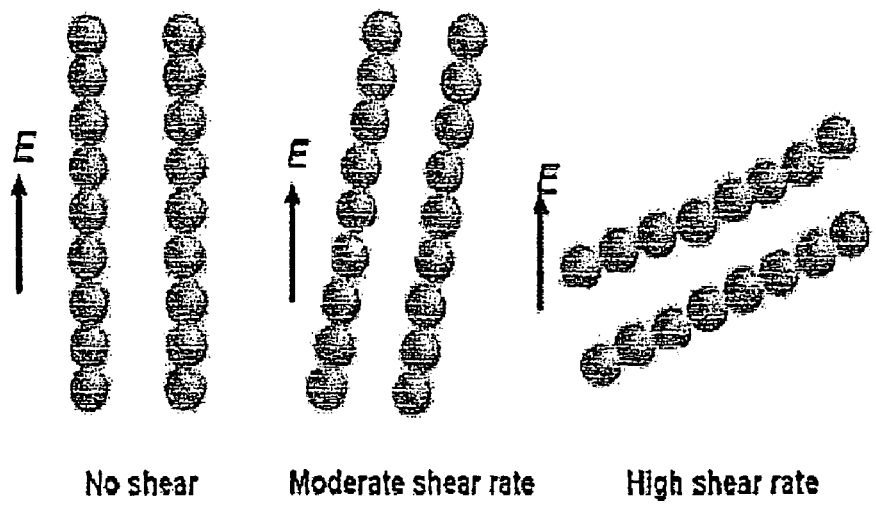
FIG. 1 illustrates the decrease to shear/flow resistance at high shear rates.

The present invention is based on the observation that the high electric field state of an ER fluid is inherently anisotropic in nature, which can account for the above-stated problems in many ER fluid applications. That is, the high field state of the ER fluid derives its solid-like strength from the agglomeration of the solid particles (in the ER suspension) along the electric field lines. Thus perpendicular to the electric field lines there is only a weak binding force even at high applied electric fields. In the case of shear, FIG. 1 illustrates why the resistance to shear decreases at high shear rate.

Figure 2:
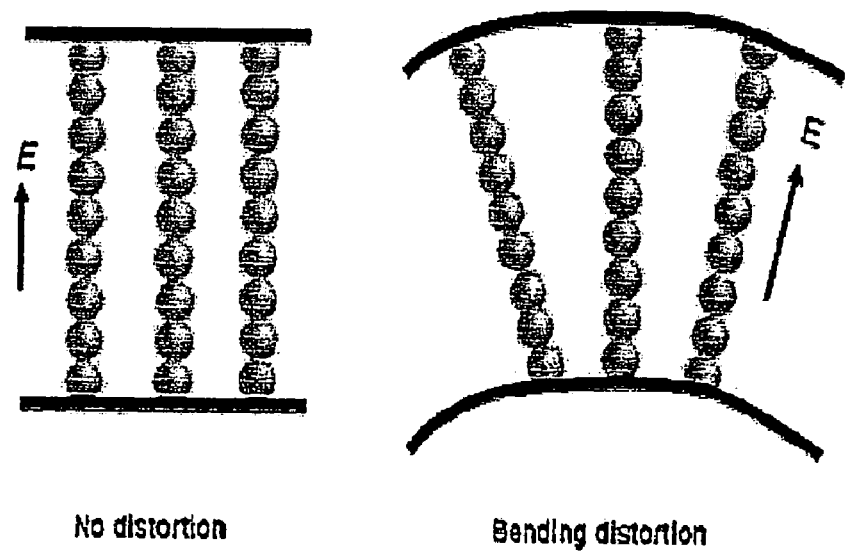
FIG. 2 illustrates the low resistance to bending distortion.

The decreasing shear resistance is due to the fact that the lines of force, which always follow the electric field, have increasingly smaller projected components on an (imaginary) line joining the particles as the shear rate increases. A similar reason holds for flow resistance applications. For the bending distortion, FIG. 2 illustrates again that the distortion is generally perpendicular to the lines of force, thus resistance to distortion is weak since the force between/perpendicular to the chains is much weaker than those along the chains.

The present invention provides a solution to the problems of the prior art, or at least mitigates those problems, by employing electrode configurations designed whereby the electric field is parallel to the expected direction of distortion. In that case regardless of the shear rate, there will always be a significant projection of line of force on the (imaginary) line joining the particles, thus offering greater resistance. It will be understood that the applied electric field can be either AC or DC.

Figures 3A, 3B:
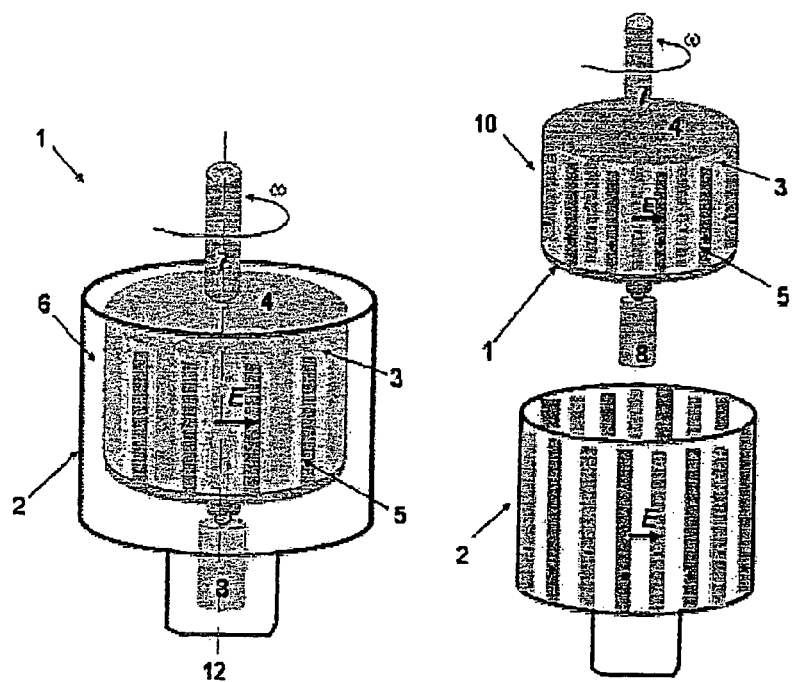
FIGS. 3(a) and (b) illustrate schematically an ER clutch according to an embodiment of the invention.

FIG. 3 shows a first embodiment of this invention in the form of an ER clutch. FIG. 3(a) shows the clutch assembled, FIG. 3(b) shows the clutch in an exploded view for clarity. The cylindrical ER clutch 1 consists of a rotor 10 and an insulating outer cylinder 2. The rotor 10 is placed inside the insulating outer cylinder 2 and along the centre axis 12 of the outer cylinder. A gap 6 is formed between the outer cylinder 2 and the rotor 10 and a conventional ER fluid is disposed in this gap 6. The rotor 10 comprises of a cylindrical part 3 and two electrodes 7 and 8 which can be connected to positive and negative sources of potential. The cylindrical part is made of insulating material, e.g., plastic, on which two cup-shaped metallic electrodes 4 and 5 with vertical strips are mounted. Electrode 4 is connected to electrode 7, and electrode 5 connects with electrode 8. The vertical strips of the electrodes 4,5 extends on the outer surface of the rotor 10 parallel to the center axis 12.

The vertical strips formed as part of each electrode 4,5 are spaced equidistantly around the rotor, and the spacing between two adjacent strips of electrode 4 is the same as the spacing between two adjacent strips of electrode 5 and the strips are disposed such that the vertical strips from the top electrode 4 and bottom electrode 5 alternate about the circumference of the rotor 12, so that if electrodes 4,7 are provided with a negative potential, and electrodes 5,8 are provided with a positive potential, then alternating positive and negative voltages appear along the rotor surface.

If the separation between two adjacent electrodes of opposite polarity is λ, then a significant electric field will extend outward from the cylindrical surface, to a distance ~λ. Moreover, the electric field will have a significant component which is parallel to both the surface of the cylinder 2, and perpendicular to the strips. The gap 6 between the outer cylinder 2 and the rotor 10 is preferably also of the order of λ, so that there is a significant electric field filling the entire gap. When there is relative rotation between the inner and outer cylinders, it can be seen that the shearing distortion would be parallel to the electric field in this case.

It will also be appreciated that the alternating vertical strip electrodes can be placed on the inner circular surface of the insulating outer cylinder 2 either instead of or in addition to the cylindrical part 3 of the rotor. If the alternating vertical strip electrodes are placed on surfaces both of cylindrical part 3 of the rotor 10 and of insulating outer cylinder 2, then the (+ and −) voltage should be applied alternately to either the rotor or the outer cylinder as a function of time, e.g., every few seconds the applied voltage would switch from one to the other.

Figure 4:
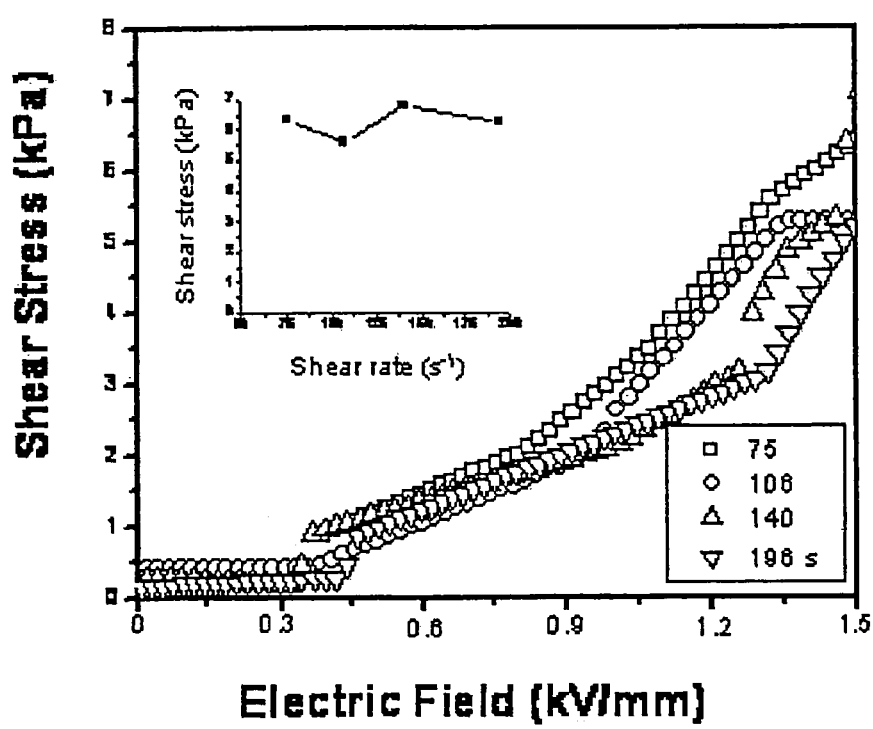
FIG. 4 shows the relationship between sheer stress as a function of applied electric field at different shear rates in the clutch of FIG. 3.

FIG. 4 shows the experimental results obtained with a cylindrical ER clutch in accordance with the embodiment of FIG. 3 with an insulating outer cylinder. The separation between the strips is 1 mm, and the gap between the inner and outer cylinder (inner surface) is 0.5 mm. The ER fluid comprises coated nanoparticles with a 50 nm (average diameter) barium titanyl oxalate core and a 5 nm (average thickness) urea coating, with the nanoparticles being dispersed in silicone oil with a concentration of 1 g of particles in 0.7 ml of silicone oil. In FIG. 4 the measured shear stress is plotted as a function of electric field for four shear rates 75 $s^{-1}$, 106 $s^{-1}$, 140 $s^{-1}$ and 196 $s^{-1}$. The inset shows the shear stress as a function of shear rate at 1.5 kV/mm of applied electric field and it can be seen that the shear stress is fairly constant up to a shear rate of 200 $sec^{-1}$, the shear stress is almost a constant.

Figure 5:
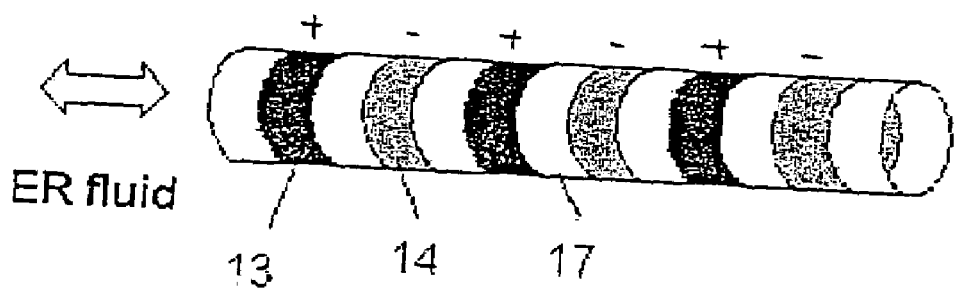
FIG. 5 shows an embodiment of the invention for increasing flow resistance in a cylindrical channel.

A second embodiment of the invention provides an ER damper application where the application of the electric field to the ER fluid has the purpose of increasing the flow resistance in a channel. FIG. 5 shows an embodiment in the form of a cylindrical channel, while FIG. 6 shows a parallel-plate channel.

Referring to FIG. 5, metallic circular strip electrodes 13, 14 are formed along the inside. circular surface of an insulating cylindrical channel 17, in which ER fluid is filled, so that the electrodes 13,14 extend about the inner circumference of the channel 17. The strip electrodes 13,14 are provided with positive and negative potentials such that equidistantly spaced positive and negative electrodes alternate along the length of the cylindrical channel 17. The diameter of the cylindrical channel should be of the same order as the separation between two electrodes 13,14 of opposite polarity. The electric field E generated in this electrode configuration is parallel to the left/right flow directions of the ER fluid as shown by the arrows in FIG. 5.

Figure 6:
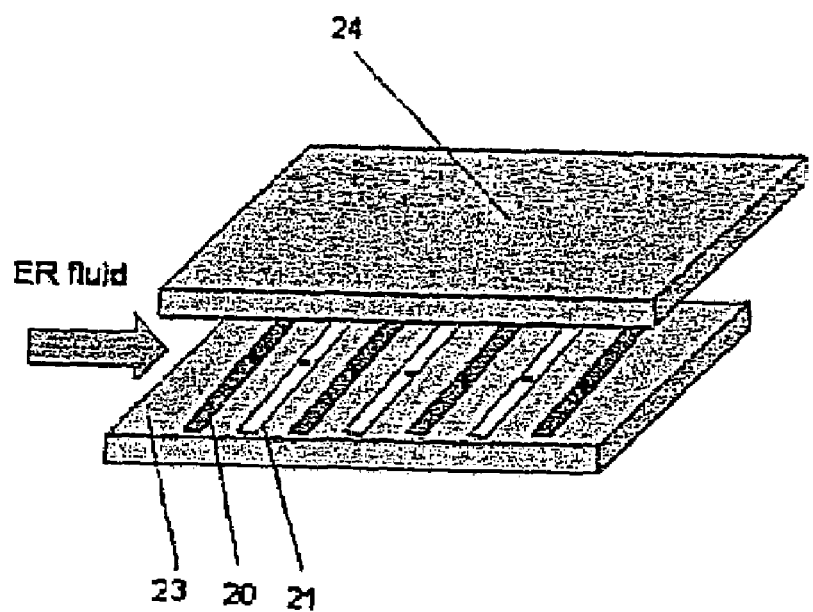
FIG. 6 shows an embodiment of the invention for increasing flow resistance in a parallel-plate channel, and FIGS. 7(a) and (b) show an embodiment of the invention in the form of a tube of variable bending resistance.

Similarly, in the case of a parallel-plate channel as shown in FIG. 6, alternate positive and negative voltages can be applied to equidistantly spaced metallic strip electrodes 20 and 21, respectively, which are mounted on a flat, insulating substrate 23 to increase the resistance in the left/right flowing directions of the ER fluid (flow direction is illustrated by the arrow in FIG. 6). The electrodes 20,21 extend parallel to the direction of flow. An insulating counter substrate 24, together with the substrate 23, defines a gap whose width is of the same order as the separation between the positive and negative strip electrodes 20 and 21, wherein the ER fluid is filled.

In both cases the parallel field configuration offers the advantage that even in high flow rates, the solid particles in the ER fluid will still experience considerable attractive interaction, thus offering resistance to flow the magnitude of which can be tuned through the applied voltage.

Figure 7A:
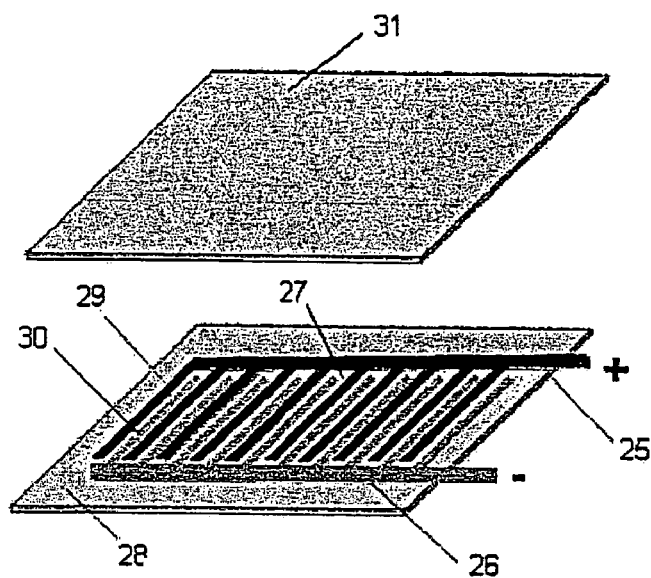
Figure 7B:
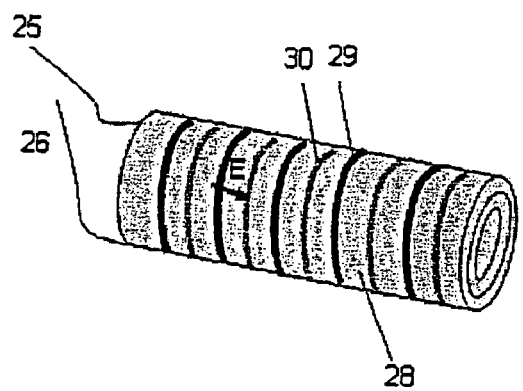

In a third embodiment of the invention, it is proposed that sometimes it is desirable to have a thin tube or catheter which can vary its stiffness through the application of an electric field. In this embodiment an inter-digital electrode configuration is provided on an insulating flexible sheet as shown in FIG. 7(a). Two comb-shaped metallic electrodes 25 and 26 are mounted such that the strips 29, 30 of the each comb-shaped electrode are alternately inter-aligned, like a ladder, on an insulating flexible sheet 28. Again, voltage can be applied to each comb-shaped metallic electrode. ER fluid is filled in the space 27 between the stripes of the comb-shaped metallic electrodes. The insulating sheet with the inter-digital metallic electrodes is then sealed by another insulating flexible sheet 31 placed over it. The thin, flexible layered structure can then be rolled along the direction parallel to the metallic strips as shown in FIG. 7(b). In this case, the electric field will be along the length direction of the tube (or catheter), and any bending distortion will encounter significant resistance since in this case the line of force is along the distortion direction so that the solid particles in the ER suspension will be stretched apart.

The invention claimed is:

1. An electrorheological clutch comprising, a cylindrical housing, a cylindrical rotor provided within said cylindrical housing and adapted to rotate about an axis of rotation, first and second electrodes at opposite ends of said rotor, and an electrorheological fluid disposed between said housing and said rotor, wherein said clutch further comprises a plurality of strip electrodes that extend from said first and second electrodes on the outer surface of said cylindrical rotor toward the other of said first and second electrodes parallel to said axis of rotation and spaced equidistantly about said axis of rotation such that positive and negative electrodes alternate about said axis, for generating an electric field, said electrode configuration being such as to generate a significant component of said electric field perpendicular to an axis of rotation of said drive and driven members, and parallel to the surfaces of the drive and driven members.

2. An electrorheological clutch according to claim 1, wherein said electrodes are in motion relative to said electrorheological fluid and arranged such that an electric field is generated having a significant component parallel to the direction of an anticipated external stress field.

3. An electrorheological clutch as claimed in claim 2 wherein said plurality of positive and negative electrodes are formed on an insulating substrate, said electrodes being disposed on said substrate so as to provide a series of equidistantly spaced alternately positive and negative electrodes in said direction of an anticipated external stress field.

4. A clutch as claimed in claim 1 wherein the spacing between the rotor and the cylindrical housing is of the same order as the spacing between the strip electrodes.

5. A clutch as claimed in claim 1 wherein strip electrodes parallel to the axis of rotation are additionally provided on the inner surface of the cylindrical housing.

6. A clutch as claimed in claim 1 wherein the strip electrodes extending from the first electrode toward the second electrode, and the strip electrodes extending from the second electrode toward the first electrode are of equal length and are equally spaced from each other.

7. The clutch of claim 1, wherein said electrodes are cup-shaped.

8. An electrorheological clutch comprising;
a cylindrical drive member;
a cylindrical driven member and an electrorheological fluid disposed between said drive member and said driven member;
an electrode configuration for generating an electric field, said electrode configuration being such as to generate a significant component of said electric field perpendicular to an axis of rotation of said drive and driven members, and parallel to the surfaces of the drive and driven members; and
a cylindrical rotor provided within a cylindrical housing, said rotor being adapted to rotate about said axis of rotation, and said electrode configuration comprising a plurality of strip electrodes parallel to said axis of rotation and spaced equidistantly about said axis of rotation such that positive and negative electrodes alternate about said axis,
wherein said cylindrical rotor is provided at opposite ends with first and second electrodes, and wherein said strip electrodes extend from said first and second electrodes on the outer surface of said cylindrical rotor toward the other of said first and second electrodes, and wherein strip electrodes parallel to the axis of rotation are additionally provided on the inner surface of the cylindrical housing.

* * * * *